(12) United States Patent
Teets et al.

(10) Patent No.: US 8,552,575 B2
(45) Date of Patent: Oct. 8, 2013

(54) HYBRID ELECTRIC POWER FOR VEHICULAR PROPULSION

(75) Inventors: Joseph Michael Teets, Hobe Sound, FL (US); Jon William Teets, Scottsdale, AZ (US)

(73) Assignee: TMA Power, LLC, Hobe Sound, FL (US)

( * ) Notice: Subject to any disclaimer, the term of this patent is extended or adjusted under 35 U.S.C. 154(b) by 68 days.

(21) Appl. No.: 13/506,179

(22) Filed: Apr. 2, 2012

(65) Prior Publication Data

US 2013/0049364 A1 Feb. 28, 2013

Related U.S. Application Data

(60) Provisional application No. 61/516,482, filed on Apr. 4, 2011.

(51) Int. Cl.
*H02P 9/04* (2006.01)
(52) U.S. Cl.
USPC .................................................. 290/40 C
(58) Field of Classification Search
USPC .................................................. 290/6, 40 C
See application file for complete search history.

(56) References Cited

U.S. PATENT DOCUMENTS

| | | | |
|---|---|---|---|
| 4,961,406 A | 10/1990 | Burandt | |
| 5,081,832 A * | 1/1992 | Mowill | 60/792 |
| 5,327,987 A * | 7/1994 | Abdelmalek | 180/65.25 |
| 7,574,853 B2 * | 8/2009 | Teets et al. | 60/39.01 |
| 7,574,867 B2 * | 8/2009 | Teets et al. | 60/792 |
| 7,762,366 B2 | 7/2010 | Janson | |
| 7,770,678 B2 | 8/2010 | Nozaks | |
| 7,795,839 B2 | 9/2010 | BloomField | |
| 7,832,511 B2 | 11/2010 | Syed | |
| 7,849,944 B2 | 12/2010 | DeVault | |
| 2012/0000204 A1 * | 1/2012 | Kesseli et al. | 60/778 |

OTHER PUBLICATIONS

Conceptual / Design and Simulation of a Small Hybrid-Electric Unmanned Aerial Vehicle, Journal of Aircraft, vol. 43, No. 5, (9) Pages Sep.-Oct. 2006.
Everything but the Pilot AOPD Nov. 2011 p. 87-91.
Control Mag. Jan. 2011 p. 15-18.

* cited by examiner

*Primary Examiner* — Tho D Ta

(57) ABSTRACT

This invention relates to a hybrid gas turbine (HGT) engine powerplant having electrical output power and as a system independently or in combination with electrical energy storage means, supplies electrical power to at least one electric motor for vehicular propulsion.
The HGT has a minimum of two spools at least one spool, the power spool, has integrated a compressor rotor, turbine rotor and alternator rotor; a minimum second spool for staged engine air compression has integrated a compressor and turbine rotors aero-coupled to the power spool.
An electronic engine unit (EECU) supplies electrical power to the fuel control valve, has preprogrammed variable power spool speeds per output power requirements, exhaust gas turbine temperature limits for fuel economy considerations and is responsive thru vehicle throttle commands of accel, decel, constant vehicle operations, start-up, shut down, battery charger and auxiliary power applications (APU).

16 Claims, 6 Drawing Sheets

SECTION BB

HYBRID ELECTRIC POWER FOR VEHICULAR PROPULSION

The application claims benefit of the provisional application Ser. No. 61/516,482 filed Apr. 3, 2011.

BACKGROUND OF THE INVENTION

1. Field of the Invention

The present invention relates generally to hybrid vehicular propulsion and more specifically a hybrid gas turbine in a hybrid vehicular electric propulsion system having a minimum of two electrical power sources, one being a Hybrid Gas Turbine (HGT) and the other a battery pack (stored electrical energy means). The electrical power sources can be used in combination either in series or parallel to extend travel range or increase the output power electric power requirements to the electric motor prime mover.

In a stand alone mode either the electric power storage source or hybrid gas turbine engine electrical output power source is used to power the electric motor-prime mover to further extend the travel/mission range and or improve fuel efficiency without combustion emissions compromise. The hybrid gas turbine engine is an electrical powerplant having a minimum of two spools, one spool is the power rotor N2 having an integral alternator, a compressor rotor and turbine rotor; the other spool N1 has a compressor rotor and drive turbine rotor to deliver compressed air to the compressor inlet. In application the hybrid gas turbine engine thru predetermined select power spool N2 rotor speeds (RPM settings) are reduced dependant on the required electrical output power load for the prime mover electric motor. The N2 spool speeds are defined via algorithms within an Electronic Engine Control Unit (EECU) to optimize fuel usage with reduced output electrical power requirement. The N1 spool RPM will regulate the compressed air supply to the N2 spool via. The N2 turbine rotor exhaust gas waste heat energy availability where higher heat more air flow is generated.

2. Description of the Prior Art

It can be appreciated that hybrid-vehicular propulsion has been in use for years. Typically, hybrid-vehicular propulsion are comprised of Electric Power Source Control (EPSC) in a parallel hybrid system is a electro-mechanical device auto or manual select the electric power source either as a single or dual source. The Electric Control is electronic device that selects the electric power source either as a single (stored energy source or internal combustion energy source, ICE) or combined dual source in a parallel hybrid system engine generated electrical power for electric motor output propulsion means. Hybrid vehicles having battery packs and or in combination with an internal combustion engine either thru series or parallel systems as electrical power sources used to drive at least one electric motor for vehicular propulsion.

The main problem with conventional hybrid-vehicular propulsion are the piston type internal combustion engine (4 stroke or 2—gasoline engine) of a hybrid vehicle incorporate a clutch engaged gearbox driven generator for electrical output power and or use direct clutch mechanical drive to the differential all of which are complex, weighty, bulky, engine cycle efficiency drops considerably below design (max. power output) operation, has exhaust emissions requiring post combustion treatment, is a complex engine assembly, requires separate engine liquid cooling means, is limited tin fuel use selection, has engine and power-train maintenance requirements. Another problem with conventional hybrid-vehicular propulsion are piston type internal combustion engines including the Atkinson cycle clutch engaged generator for electrical output power has so some improvement in cycle efficiency but is also weighty and complex, bulky, cycle efficiency greatly reduced at off design conditions, has complex intake valve phasing can to crankshaft, maintenance requirements, requires ignition controls to avoid detonation issues, engine response is slow, has limited fuel use, requires, post combustion exhaust gas treatment to meet emissions regulations, has many engine components and liquids for cooling the engine. Another problem with conventional hybrid-vehicular propulsion is the use of diesel engines that have high quantity of engine components, incorporate complex clutch engaged electrical output power generator and or separate drive shaft for output power to the transmission or differential. Although this engine has improved fuel economy over the gasoline piston engines, it is weighty, complex, bulky, efficiency drops off considerably at of design conditions, is limited in fuel use, requires exhaust gas treatments to meet emission regulation, is complex engine assembly, has high maintenance consideration, requires additional engine liquids for cooling and engine response to accelerate less responsive than gasoline piston engines whereas the hybrid gas turbine can be set with instantaneous acceleration.

While these devices may be suitable for the particular purpose to which they address, they are not as suitable for a Hybrid Gas Turbine vehicular propulsion system for electrical powered vehicles having at least two electrical power sources, one being a Hybrid Gas Turbine and another a battery pack.

SUMMARY OF INVENTION

In view of the foregoing disadvantage inherent in the know type of hybrid vehicular propulsion now present in the prior art, the present invention provides a new invention a Hybrid Gas Turbine (HGT) for hybrid vehicular propulsion system for electrical powered vehicles having at least two electrical power sources, one being a Hybrid Gas Turbine and another a battery pack (stored electrical energy); either in combination or separately supplying electric power to at least one electric motor—prime mover vehicular propulsion to extend the range and improve fuel use without emissions issue and or the complexity of staged fuel injection or combustion variable geometry common to single shaft/single spool microturbines.

Also as a prime mover of a vehicle, the HGT can be used as the sole electrical power source in a non hybrid power (two electrical power sources) application and thru a variable speed power spool, obtain optimum fuel economy at various power requirements without compromise. For less than maximum electrical power requirements, reduced/select power spool speed algorithms are defined in the EECU defining the off-design optimum fuel flow requirements for reduced fuel use considerations. Ref. FIG. 3.

The general purpose of the present invention, which will be described subsequently is grater detail, is to provide a HGT for vehicular propulsion that has many of the advantages of a hybrid-vehicular propulsion mentioned heretofore and many novel features that result is HGT for vehicular propulsion which is not anticipated, rendered obvious, suggested, or even implied by any of the prior art hybrid-vehicular propulsion, either alone or in any combination thereof.

To attain this, the present invention generally comprises a Hybrid Gas Turbine (HGT), Fuel Valve, Fuel Control System (Engine Control Unit (EECU), Throttle Box, Power Electronic, Batter Pack, Voltage Regulator, Electric Power Source Controller (EPSC), Power Motor with controller and a Differential.

The HGT is a two spool gas turbine engine that generates electrical output power having a power output spool consisting of an integrated alternator rotor, compressor rotor and a turbine rotor, an alternator stator located co-axially about and in close proximity to the alternator rotor; a second spool having a compressor rotor, turbine rotor and also rotor shaft with bearings and aero coupled to the power rotor and housed within an engine body along with a combustion means with fuel delivery means, for heat energy to drive the turbine rotors. The Fuel Valve is an electromechanical device that controls the fuel flow to the engine's combustor, based throttle box—output engine electrical power vehicle propulsion demand, The Fuel Control is an electronic engine control unit (EECU) and supplies electrical power to electromechanical valve to govern fuel flow with power based algorithms—monitors engine sensor signal, vehicle operation and ambient conditions. The Power Electronics converts engine output high voltage-high frequency power to useful electrical power and frequency. The Throttle Box is an operator command means for electrical output power vehicle requirements, thru an electrical or electro-mechanical signal (on-board or remote) device. The Power Motor having an integrated motor controller, receives electrical power from the vehicle electric power source for vehicle propulsion. The Battery Pack is a chemical energy storage means for electrical output power source. The Voltage Regulator in a series hybrid system, maintains the battery voltage via output electric engine power and in a parallel hybrid power system it maintains a battery voltage. The Differential is means to translate the Power Motor output shaft rotational energy to vehicle drive wheel of vehicular propulsion, propeller, fan blade rotor, rotor blades for aircraft/helicopters or boat. The Electrical Power Source Controller (EPSC) is an electrical device used to select the onboard vehicle propulsion electric power source either manually or automatically and has EECU interface.

There has thus been outlined, rather broadly, the more important features of the invention in order that the detailed description thereof may be better understood, and in order that the present contribution the art may be better appreciated. There are additional features of the invention that will be described hereinafter.

In this respect, before explaining at least one embodiment of the invention in detail, it is tot be understood that the invention is not limited in its application to the details of construction and to the arrangements of the components set forth in the following description or illustrated in the drawing. The invention is capable of other embodiments and of being practiced and carried out in various ways. Also, it is to be understood the phraseology and terminology empowered here in are of the purpose of the description and should not be regarded as limiting.

The primary object of the present invention is to provide a hybrid gas turbine (HGT) for vehicular propulsion that will overcome the shortcomings of the prior art devices.

An object of the present invention is to provide a HGT for vehicular propulsion for a HGT vehicular propulsion system for electrical powered vehicles having at least two electrical power sources, one being a HGT and other battery pack (stored electrical energy); either in combination or separately supplying electric power to an electric motor-prime mover vehicular propulsion to extend the range, improve fuel use without emissions issues and overall simplicity. Also as a prime mover of a vehicle, the HGT can be used as the sole electrical power source in a non hybrid power (two electrical energy sources) application and thru a variable speed power spool, obtain optimum fuel economy at various power requirements without compromise. For less than maximum electrical power requirements algorithms defined in the ECU the power spool speed (N2 spool) for the off-design fuel flow requirements, maximum power conditions, start, stop, accel and decel of the HGT engine power rotor speeds. Ref. FIG. 3

Another object is to provide a hybrid gas turbine for vehicular propulsion that uses a HGT as an electrical power source in the hybrid propulsion system offers compactness, light and high power density (high power to weight ratio), fast response electrical output power, is electrically coupled to the drive motor prime mover for vehicle propulsion, offering simplicity, multifuel and maintenance free engine (high reliability).

Another object is to provide a HGT for vehicular propulsion as an electrical powerplant that yield improved fuel economy at off design power vehicle cruise power conditions.

Another object is to provide a HGT for vehicular propulsion that as an internal combustion engine, has low emission combustion without staged fuel delivery or variable combustion geometry. Also because of only 2 moving parts offers high durability over the prior art along with the no separate liquids of cooling.

Another object is to provide a HGT for vehicular propulsion that HGT is without a weighty, life limited, expensive recuperator typical to the single spool microturbines.

Other object and advantages of the present invention will become obvious to the reader and it is intended that these objects and advantages are within the scope of the present invention.

To accomplishment of the above and related objects, this invention may be embodied in the form illustrated in the accompanying drawing, attention being call to the fact, however, that the drawing are illustrative only, and that changes may be made in the specific construction illustrated.

BRIEF DESCRIPTION OF THE DRAWINGS

Various other object, features and attendant advantages of the present invention will become fully appreciated as the same becomes better understood when considered in conjunction with the accompanying drawing, in which like reference characters designate the same or similar parts throughout the several view and wherein.

DESCRIPTION OF THE PREFERRED EMBODIMENT

Figure 1:
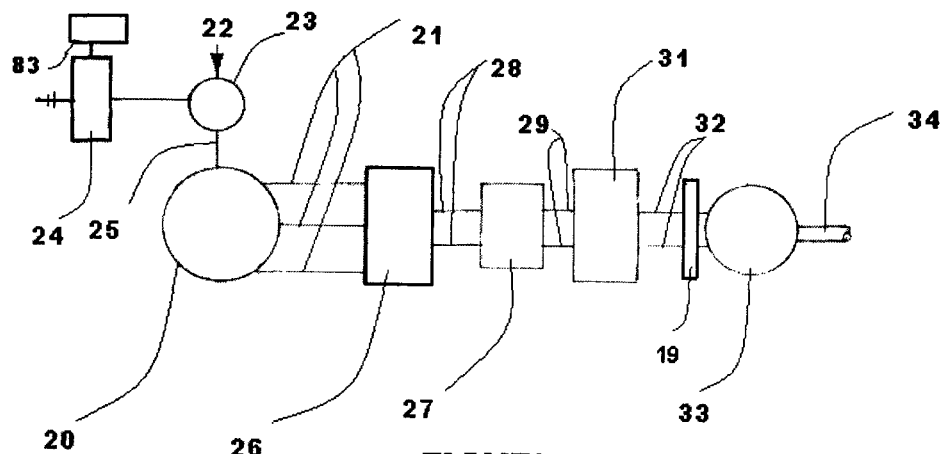
FIG. 1 is a Hybrid Gas Turbine schematic, series hybrid electrical power system

Turning now descriptively to the drawings, in which similar reference characters denote similar elements throughout the several view, the attached figures illustrate a HGT for vehicular propulsion, which comprises a HGT, Fuel Valve, EECU (electronic engine control unit), Throttle Box, Power Electronics, Battery Pack, Voltage Regulator, Electric Power Source Controller, Power Motor (with controller) and Differential. The HGT is a two spool gas turbine that generates electrical output power; the power output spool N2 integrated alternator rotor, compressor rotor and turbine rotor. An alternator stator is located co-axially about and in close proximity to the alternator rotor. The other spool N1, airflow producer, has a compressor rotor, turbine rotor an rotor shaft with bearings; is compressor/aero coupled to the power spool N2; housed within an engine body and has a combustion means for heat energy to drive the turbine rotors. The Fuel Valve is a electro-mechanical device that controls the fuel flow to the engine's combustor, based on Throttle Box operator command-output engine electrical power vehicle propulsion requirement. The Fuel Control is in communication with the electronic engine control unit (EECU). The EECU supplies electrical power to the electro-mechanical fuel valve to govern fuel flow and the EECU has electrical based algorithms—monitors engine sensor signals, vehicle operation and ambient conditions. The power electronics converts engine output high voltage-high frequency power to useful electrical power and frequency.

The Throttle Box is an operator command means for electrical output power vehicle requirements thru an electrical or electro-mechanical (on-board or remote) device. The Power Motor has integrated motor controller, receives electrical power from the vehicle electric power source for vehicle propulsion. The Battery Pack is a chemical energy storage means for electrical output power source. The Voltage Regulator in a series hybrid system maintains the battery voltage via output electric engine power and in a parallel hybrid power system maintains a battery voltage. The Differential is a means to translate the Power Motor output shaft rotational energy to the drive wheels of the vehicular propulsion, propeller, fan bladed rotor or rotor blades for aircraft or boat applications. The Electrical Power Source Controller (EPSC) is an electrical device used to select the on-board vehicle propulsion electric power source either manually or automatically and has EECU interface.

In operation ambient air engine body inlet 11 is drawn into the engine body 20 via compressor inlet 18 with N1 spool 30 rotation via N2 spool 40, ducted waste heat energy 37 driving N1 spool 30, thru turbine rotor inlet 55, turbine rotor 52 driven compressor 51 of spool 30, discharging compressed air into duct 38, and to the (N2) compressor rotor inlet 47 of compressor rotor 41. The power spool N2 #40, has integrated turbine rotor 71, alternator rotor 45, rotor shaft 43, having bearings 44, compressor rotor 41 discharges compressed air into duct 69 into the combustor housing—combustion chamber 35 where it mixes with supplied fuel 16A and ignited within for heat energy to drive the N2 spool 40 drive turbine rotor 71 rotor causing to connected compressor rotor 41 and alternator 46 rotation and subsequent electrical power output from the closely positioned co-axial located stator 46 about the alternator rotor 45, the stator having iron laminats and electrical wires within where relative rotation cause magnetic flux electric energy within the wire, and then passes thru the wire leads 21 exiting the engine body as electrical output power. The output electrical power is non-synchronous, high frequency and high AC voltage. The HGT engine 20 module has variable power spool speed (RPM) capability to optimize fuel usage and thus fuel economy.

With lower output electrical power requirements the power spool N2 is reduced. Low or reduced power spool speeds can be ~50% max power RPM the idle speed. N1 spool speed is dependant on residual N2 turbine exhaust waste heat and could with RPM down to ~20% of maximum N1 spool speed. With lower output electrical power requirements the power spool can be reduced as low as idle range along with subsequent responsive N1 spool and dependant on the amount of power thru a set of algorithms within the EECU, N2 spool speeds can be optimized/selected to hold at, (having unique N2 exhaust gas turbine limits/speeds) the N1 spool compressor rotor supplies the air for the engine power output vehicle requirements.

As an alternate electrical electric power source, a single spool type microturbine could be incorporated but variable geometry in fuel nozzle staging into the combustor and or airflow control to the combustor (primary or dilution zones) could be implemented to prevent combustion carbon issue but this simple cycle engine efficiency (max. 15%) would be compromised compared to the two spool HGT at 23%+ cycle efficiency. Also air bearings would not be practical due to related vehicle g loads and stop and start limitations. Other gas turbine type engine either a single spool or two spool having a free turbine that drives a generator could be incorporated but cycle efficiency complexity is a deterrent.

The Fuel Valve is an electro-mechanical device that controls the fuel flow to the engine's combustor, based throttle box-output engine electrical power vehicle propulsion demand. The Fuel Valve incorporates an electro-mechanical valve where an electric signal (voltage or amperage driven) from the electronic engine fuel control (EECU) positions a mechanical variable fuel flow restriction device as to open or close the related area flow for liquid or gaseous fuels. The Fuel Supply incorporates an electro-mechanical valve, instead position a variable axial rod within an orifice the electric power signal could drive an electric motor having a rotary type valve position means. Also as another means of the fuel valve, a variable speed electric fuel pump could be implemented where the fuel flow is governed by the motor speed—supplied electric power supply and control by algorithms in the interfaced EECU.

The fuel control is an electronic system within the electronic engine control unit, that supplies electric power to the electro-mechanical valve to govern fuel flow, has power base algorithms-monitors engine sensor signal, vehicle operation and ambient conditions. The fuel control is within the EECU that supplies discrete electrical power to the Fuel Valve for control of engine fuel flow via Throttle Box operator command engine power requirements. The EECU monitors various engine electric sensor signals (pressure, temperatures, positioners, actuators, engine RPM, fuel flow), vehicle power needs, vehicle speed, throttle position, ambient conditions and thru algorithms (accel rates, decel rates, steady state condition, start and stop sequences) processes electric power signal to drive the fuel valve and or fuel pump for fuel flow. Also incorporated in the EECU, if required algorithms for any supplemental fuel supply regulation or simply on-off solenoid fluid controls as a separate start fuel nozzle system to initiate combustion within the combustor. Also an electro-mechanical solenoid valves for starting, stopping and continuous engine operation, fuel purge can also be controlled thru the EECU. The solenoid valves for various functions to receive command signals for sequencing fuel flow to the start fuel nozzle system with orifice meter within the fuel supply line, purging fuel from supply lines or simple on/off requirements of main fuel system and or integrated start within the main fuel supply.

The Power Electronics converts engine output high voltage-high frequency power to useful electrical power and frequency. Output electric power can be AC or DC and can be used for main motive power or maintain/charge storage batteries.

The Throttle Box is an operator command means for electrical output power vehicle requirements, thru an electrical or electro-mechanical signal (on-board or remote) device. The Throttle Box is an electromechanical device also that receives operator vehicle power commands thru an electro-mechanical positioning device and supplies an electrical power signal to the fuel control for various engine operations such as start-up, shutdown, acceleration rate of, deceleration rate of or constant speed/power operation. The Throttle Box could be remote electrical device onboard the vehicle that receives electronic input signals and relay power command/requirements the electronic fuel control dependent on power requirements.

The Power Motor having an integrated motor controller, receives electrical power from the vehicle electric power source for vehicle propulsion. is an alternator rotor—AC type with permanent magnets typically sleeve retained to the rotor core. The stator is co-axial and in close proximity to the alternator rotor having a laminat stack with wire wound field. The motor has non synchronous variable speed and high rpm capability.

The motor type selection is reflective of high response rate to power demand and has a motor-controller integrated governing the rate of electrical power being supplied for a given demand. Other types of electrical motors include AC, Synchronous, AC Asynchronous, Switched Reluctance and DC. The motor could be configured into an auto wheel or fan rotor system as a thrust means not requiring a gear box could have stator mounted to the engine case about the compressor blade rotor and not require differential could. As another aircraft application (A/C) application as a main thrust device of vehicular propulsion the drive motor or multiple drive motors can be direct connected to a high speed ducted fan having a nozzle and be remote to the HGT engine and or battery pack. As an APU, electric power from the HGT engine and or battery pack could power an electric drive motor for Air Conditioning or other accessories. The motor controller can be remote to the electric motor.

The Battery Pack is a chemical energy storage means for electrical output power source and is a rechargeable energy storage device and can be an electrochemical battery pack such a lithium-ion, nickel-metal hydride battery or aluminum-ion. Other possible forms of a electrical energy storage include a high-power capacitor, such as an ultra capacitor or combination of different examples storage technologies. chargeable energy storage device can be any other mechanism or device capable of receiving, storing and discharging electrical energy.

The Voltage Regulator in a series hybrid system maintains the battery voltage via output electric engine power and is a parallel hybrid power system it maintains a battery voltage. The Regulator senses the battery voltage and applies additional amperage or voltage from a supplemental electrical power source such as engine generated output electrical power to charge a storage system such as s battery. As a supplemental electrical power a regenerative means vehicle braking energy could be put back thru the electric motor (acting as a generator) directing electrical energy (voltage and amps) thru the voltage regulator into the battery or capacitor electrical energy storage device.

The Differential is a means to translate the Power Motor output shaft rotational energy to the vehicle drive wheels of vehicular propulsion, or propeller, fan bladed rotor or rotor blades for aircraft or boat. The Differential can be a geared device that converts the rotational energy from the Power Motor the wheels for vehicular propulsion and can act in reverse as a braking means putting electrical power energy back thru the Power Motor as a generator to store electrical energy back into the battery. Using the high speed electric motor type a reduction drive means is necessary in most cases. The Power Motor could be integrated into the wheel removing the need of a Differential. Also in applying a Hybrid Electrical Power System to a aircraft for propulsion means the Power Motor output shaft could be directly attached to a fan, bladed rotor or propeller either with or without a gearbox reduction speed drive system. As a high speed ducted fan application a high speed Power Motor (permanent magnet—alternator/stator) cold drive a high pressure ratio axial fan compressor stage within a duct incorporating a exiting nozzle for thrust means. Also as another aircraft (A/C) application, the ducted fan system is integrated into a module with a nacelle adding multi-planar thrusting capability for the aircraft vehicle. As yet another application to A/C a ducted propeller, helicopter rotor or just a propeller with or without a gear box, AC or DC motors.

The Electrical Power Source Controller (EPSC) is an electrical device used to select the on-board vehicle propulsion electric power source either manually or automatically and has EECU interface. The Electric Power Source Control (EPSC) is an electronic switching device of a parallel hybrid system interfaces with the EECU (having sensors used to monitor the engine operation, ambient conditions and vehicle performance/motion and storage electrical energy levels) is a selection means of electrical power source for vehicular motion. Also vehicle accessories can be separate and or powered thru the storage energy or main HGT power. The system interfaces with the EECU and Throttle Box. The system can be preprogrammed and computer controlled to select the engine HGT power source to charge the battery pack in a non vehicle motion mode, can interface with additional energy storage s systems such as capacitors or fly wheels during a vehicle decel braking mode and for subsequent vehicle accel modes.

Electric powered vehicles such as cars have been made in the early 1900's but range/distance to travel was limited. Other battery powered vehicles through the years followed and include: buses, trucks, off-road vehicles, planes, boats, submarines, tractors and unmanned aerial vehicles. Hybrid electric vehicles is a means to extend the range of electric vehicles thru the incorporation of onboard internal combustion engine power source and termed hybridized. Various internal combustion engines (ICE) include gasoline piston type, diesel piston engine types, sterling types and gas turbine engines. Various liquid fuels used to date in the (ICE) include gasoline, diesel, Jet A, biodiesel, biofuels, methanol, ethanol and alcohol, and gaseous fuels include: natural gas, liquefied petroleum gas line propane and hydrogen. Hybrid Electric Vehicles (HEV) have increased the range over the pure electric vehicles (EV) but the increased complexity of the HEV sometimes off-sets the gains over the EV.

The piston engine as an electrical power generator set in the HEV, to control emission is typically run at a constant RPM speed and that has its draw back in fuel economy. One of the advantages of the HEV over the batter-electric vehicle is the inherent bidirectionality of the HEV energy/work loop. The HEV power train converts stored energy into vehicle propulsion. It also converts vehicle motion back into stored energy (ex. car) or work loop through the employment of regenerative braking. Regenerative braking provides benefits, where an estimated 60% of the total energy consumed in urban driving is spent overcoming accelerating the vehicles weight. Up to half of the energy lost in starting from still condition may be reclaimed by the HEV upon deceleration. The optimal integration of subsystem united by a control structure is the best approach to increasing energy efficiency, in HEV. A control strategy is integral to the monitoring and balancing the energy flow through the vehicle. A control system integrated propulsion system will make use of batteries as an energy reservoir for load levelly as opposed to prior art making use for the batteries for main motive force. A hybridized propulsion system would include power for max conditions for acceleration and part power for cruise modes, quiet condition, no emissions and increased accessory loads. Also considered in dual operation of electrical and components to additively produce peak propulsive power; ability to regulate a rechargeable electric power storage system during cruise conditions; ability to remotely shut-down the ICE; to run in electric-only quite propulsion mode; ability remotely restart the ICE and ability to provide power to a number of electrical payloads.

Figure 4:
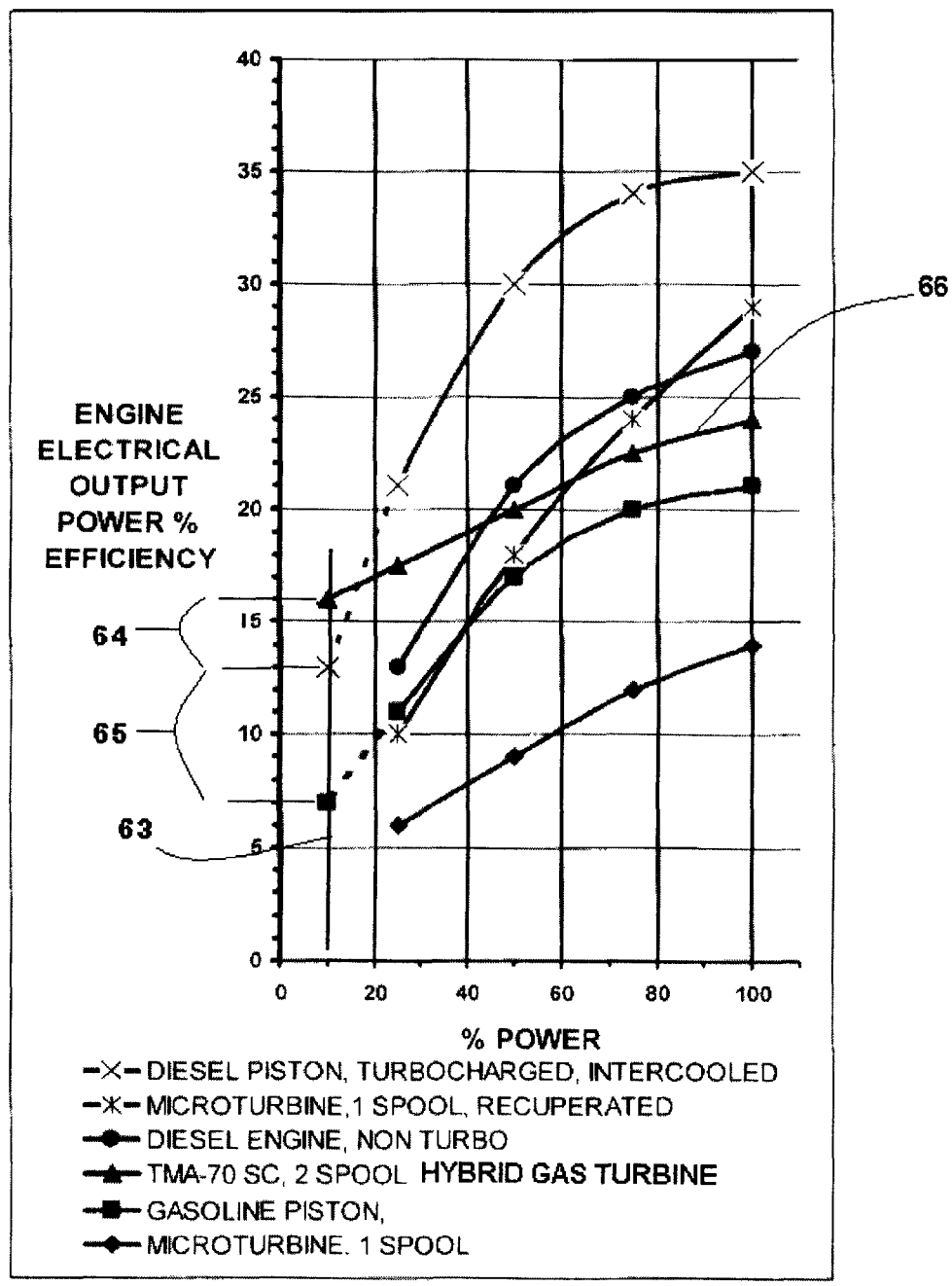
FIG. 4 is a graph of different engines, electrical output power efficiency.

This invention removes a large number of mechanical devices/drive trains typical with piston type ICE of the prior art HEV thru the use of high power density (HGT) two spool gas turbine engine having output electrical power output capable and operating at various speeds to optimize fuel efficiency thru improved engine output power cycle efficiency and have remote capability relative to the output motor propulsion device without output drive connections and at the same time not compromise on low emission at design and off design engine output power requirements. Batteries have been improved upon along with the internal combustion engine (ICE) efficiencies. Yet engine efficiency could be improved upon, the current method is thru reduced engine size but vehicle power is compromised when the battery power is reduced. Best ICE efficiency is a max. power for current stand alone non hybrid engines for acceleration and at cruise condition as for example the average auto at 60 mph only use 10% of the max power, Ref. FIG. 4 (a comparison of current ~100 HP ICE) #63 at 10% output power has the highest efficiency of the representative ICE engines; considering HEV battery power augments the power needs for acceleration and or faster vehicle speed or road inclines and therefore reduced engine speeds are incorporated but when the battery energy is depleted the reliance on the ICE power is compromised in vehicle performance. The inventive HGT is designed for a stand alone ICE operation where power for acceleration of the in not compromised with battery energy reduction. If a similar power size piston engine where used fuel use would be higher at cruise condition. FIG. 4 at the 10% power level #63, cruise condition capturing the HGT vs diesel (turbo+inter-cooled) #64, at 16% efficiency a 4% delta improved MPG or HGT 25% over the diesel; vs the piston gasoline ICE @#65 measuring 7% efficiency or HGT ~228% better fuel economy yielding range is improved for a given battery charged level. The HGT cycle efficiency in the FIG. 4 example is ~12:1 pressure ratio, if the pressure ratio (PR) were to be >26:1 to HGT cycle efficiency line #66 would be shift above the diesel piston turbocharged intercooled line. Higher PR incorporated for higher cycle efficiency in the HGT thru more compressor rotor stages, higher pressure ratio capability per stage and or spools; the higher PR would require higher N2 spool turbine inlet temperatures and or more hot section hardware cooling considerations.

Figure 5:
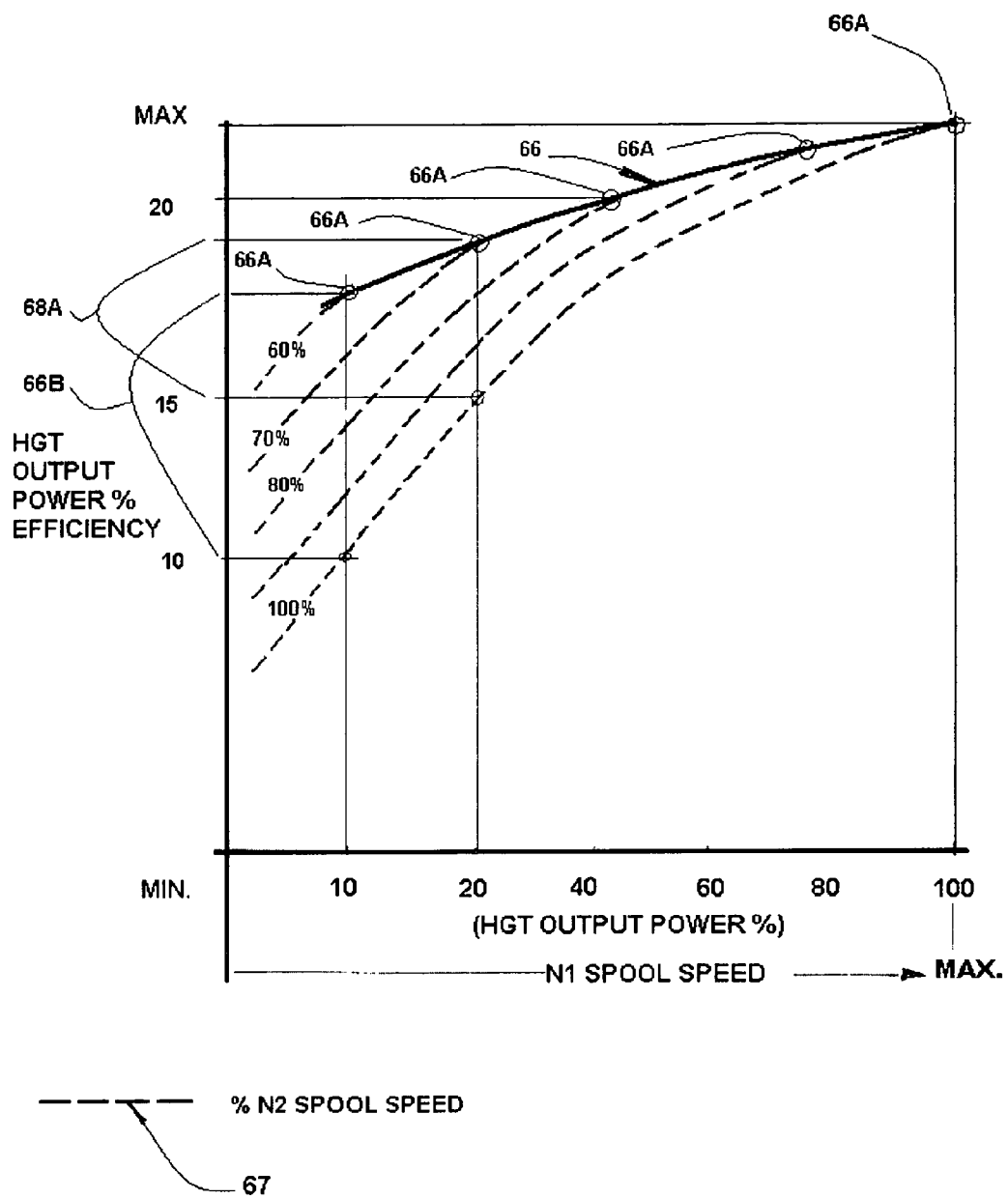
FIG. 5 is a graph, Hybrid Gas Turbine electrical output power efficiencies.

In review of the FIG. 5 line #66 represents the maximum output power/turbine inlet temperatures (TIT) allow for a given N2 spool turbine inlet 49 (blade and turbine nozzle considerations) conditions not to exceed metal temperature structural designs for a given spool speed (% speed lines #67 of maximum design rotor speed and maximum output power). % speed (RPM). The line 66 is generated thru the infinite % N2 speeds maximum power point #66A for a given N2 % speed.

The N1 spool speed min to max will vary dependant on available turbine rotor 71 exit 17 exhaust heat energy delivery 37 to the N1 spool 30 turbine rotor 56 and inlet 55 conditions and in tern the compressor rotor 51 for airflow to the inlet 47 of compressor rotor 41 spool 40 power rotor.

Figure 6:
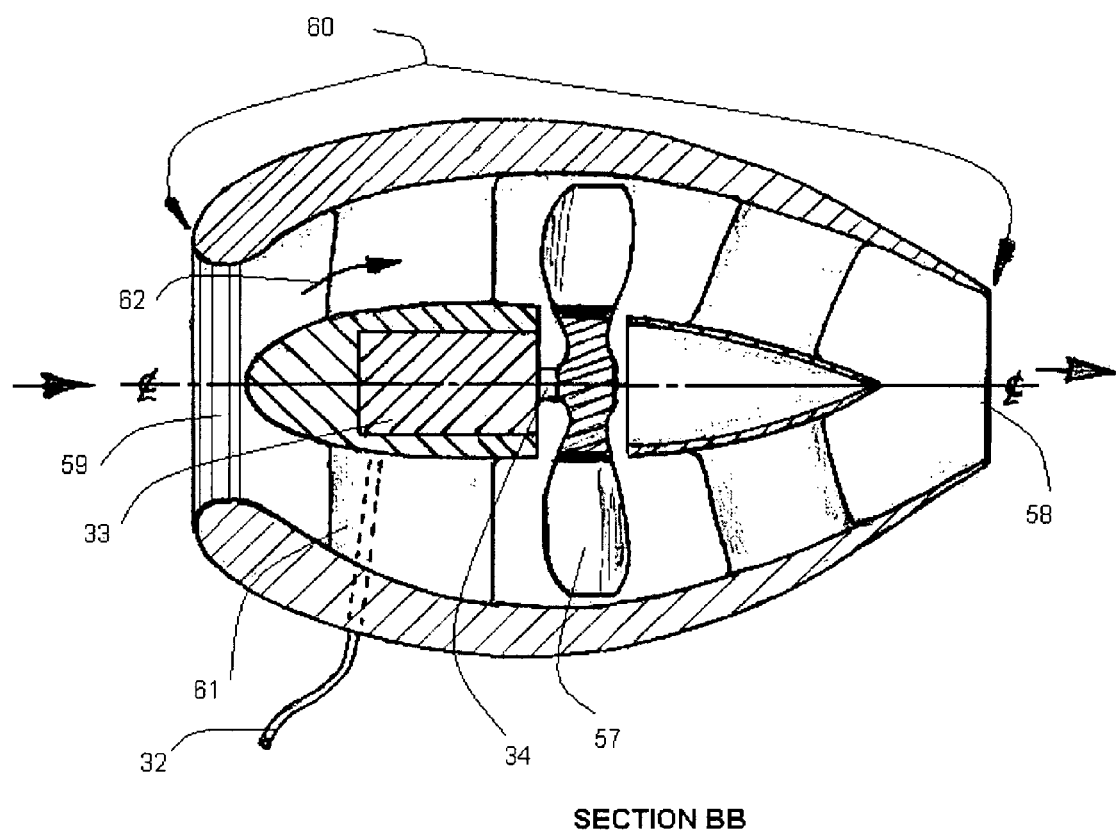
FIG. 6 is a cross section of a vehicular propulsion motor driven ducted fan system.

Considering aircraft vehicles a series hybrid system could be incorporated or as a stand alone the hybrid gas turbine as a high power density power-plant with its variable power spool speeds fuel economy as depicted in FIG. 6 can be realized. If you don't need the power you don't need the speed. The air flow for combustion and power is defined by the airflow spool (N1) driven by N2 turbine rotor waste heat.

The hybrid gas turbine can be remote to the output drive motor and power electronics for weight and balance considerations. The prime mover motor could be direct connected to a ducted fan for thrust or gear integrated to the rotor shaft for propeller rotor lift fan or helicopter rotor blades.

The vehicle having stored electrical energy—battery pack 31 as a power means to electrically start the hybrid gas turbine (HGT) module. 20 the powerplant electrical power source system interconnect to the electronic control unit (ECU) 24, having electrical interface with the power electronics 26, the vehicle operator onboard or remotely initiates a start command thru the throttle box 83 mechanical position or an electrical signal, having electrical interface with the electronic control unit 24 with preprogrammed start algorithms within switches the power electronics 26 to a start mode, connected to the electrical power battery pack 31 thru the regulator 27 and directs this power thru engine electrical power leads 21 into the alternator stator 46 within the HGT module 20 to electrically rotate alternator rotor 45 with subsequent spool 40 rotation having rotor shaft 43, bearing 44 compressor rotor 41, turbine rotor 71 to a programmed power rotor speed (revolution per minute, RPM); supplying air flow to the combustor 35 from the N2 compressor 41, with rotation draws air thru duct 38 and the interconnected N1 spool 30, compressor rotor 51 having intake 18 bladed rotor 51.

In operation beginning with throttle box command 83, signal to the EECU 24, interconnected to the power electronics 26, connects with the battery 31 thru the regulator 27, N2 spool is rotated via alternator rotor 45 battery energy 31 to the start speed, igniter is activated thru the interconnect EECU, an upstream solenoid valve is opened having communication with fuel line 22 and pressurize fuel flows to the fuel flow control valve 23 having electrical interface with the EECU opens or is preset, fuel flows then line 26 into the combustor having fuel nozzles where it ignited. Also as another means initiating combustion in the combustor 35 a separate fuel line having a metered fuel flow orifice to a separate fuel start nozzle within the combustor 35 could be incorporated to initiated the combustion flame.

Ignited heat energy in combination with the alternator rotation power allows the engine rotor speed to self sustaining speed at which time main fuel flow is transitioned into the engine run mode thru. Thru algorithms within the fuel control EECU 24, delivers run mode fuel supply electrically interconnect (electro-mechanical) fuel control valve 23. At the self-sustaining spool speed the electrical start mode is changed in the power electronics 26 via 24 (EECU, electronic engine control unit) to the engine output electrical power mode simultaneously initiating main fuel only via the fuel valve 23.

with the EECU 24 interface. The ECU 24 controls the fuel flow valve 23 thru power commands thru the Throttle box 83 interface.

During the start mode, power spool 40 compressor rotor 41 rotation deliver air the combustor 35, drawing air thru the air supply compressor rotor 51 of spool 30 interconnect duct 38 and v compressor 51 having air inlet 18 and exit 73. Once the fuel in the combustor is ignited during initial lite-off the spool 40 is electrically assist accelerated via the alternator rotor 45 supplemental energy to the developed heat energy product of combustion assists in the acceleration of the spool 40 to the self-sustaining speed. All during this start up time period waste heat energy gas from the turbine 71 exit 17 ducted 37 to the turbine rotor entrance 55 to drive the rotor 52 having exit gas 56, flow 12, drives spool 30 integral air inlet flow 11, with compressor rotor 41 with air exit flow 73 and delivery of compressed air flow to the inlet 47 of compressor rotor 41 thru interconnecting duct 38. The HGT, as a select power source hybrid electric vehicle application series system FIG. 1 or parallel system of the FIG. 2 or simple non hybrid electric the main power source, once at idle condition self sustaining speed, power Spool N2 40 is @~60% speed of the maximum capability the air supply spool N1, power extraction based thru N2 spool turbine exhaust heat in duct 37 available, is ~½ again that of N2 speed at idle no load. The amount of output electric power from 21 power output leads, power spool integrated alternator rotor 45, alternator stator 46 is dictated by the fuel flow 26 thru the fuel control valve 23 controlled by EECU 24 interconnect to the throttle box 83 operator controlled. In an accel command the throttle box position is advanced, the EECU, signal increases the fuel supply 26 flow thru valve 23 defined algorithms in the EECU, defining the accel rate for the N2 spool to attain maximum rotor speed or % speed 67 selection in preparation for electric motor 33 power load requirement via the power electronics 26 lead 21 connect engine module 20, output power leads 21. Also an accel fuel rate algorithm is used to set the engine N2 speed to a pre-selected % N2 speed 67 of FIG. 5 for a required engine output electrical power requirement then apply the load thru motor controller 33.

Furthermore the TMA Power, LLC TMA 70 engine (HGT) test data supports FIG. 5, for a given N2 speed limit 66A on line 66 N2 spool turbine exhaust waste heat to drive N1 spool turbine rotor there a defined air flow as dictated by the N1 spool compressor where increase in air flow=increase in electric output power. The engine electric output power is defined by N1 spool speed.

Considering shut down to the HGT (20 module) engine at any speed the fuel valve 23 is be activated to a shut-off via the ECU related operator command requirement throttle box 83 to stop the fuel flow to the engine and simultaneously a fuel purge valve is be activated allowing the fuel within the combustor supply lines and fuel nozzles to be purged from the engine hot sections to prevent any fuel carbon from forming within the combustor, fuel nozzle or fuel supply lines/fuel manifold. In a series system FIG. 1 the engine power will maintain the battery 31 voltage via regulator 27 having combined hybrid electric power source battery 31 and engine module 20. In a parallel system FIG. 2 the battery 31 and the engine HGT power source can be combined for maximum vehicle acceleration thru the EPSC 19 for the motor power needs. In any aircraft application the motor (motor controller could be external to the nacelle) having an output power high speed fan 57 driven by motor 33, 82 module with support struts 61 within a nacelle module 60 and yield air flow 62 drawn in thru fan 57 rotation having electrical supply power leads 32 from HGT electric power leads 23/power electronics 26 and or battery pack 31 of the electrical hybrid power supply system. Compressed air flow 76 exit thru nozzle 58 exit is thrust means along with the fan blade airfoil configuration. Power supply lead 32 pass thru a support strut 61.

Figure 7:
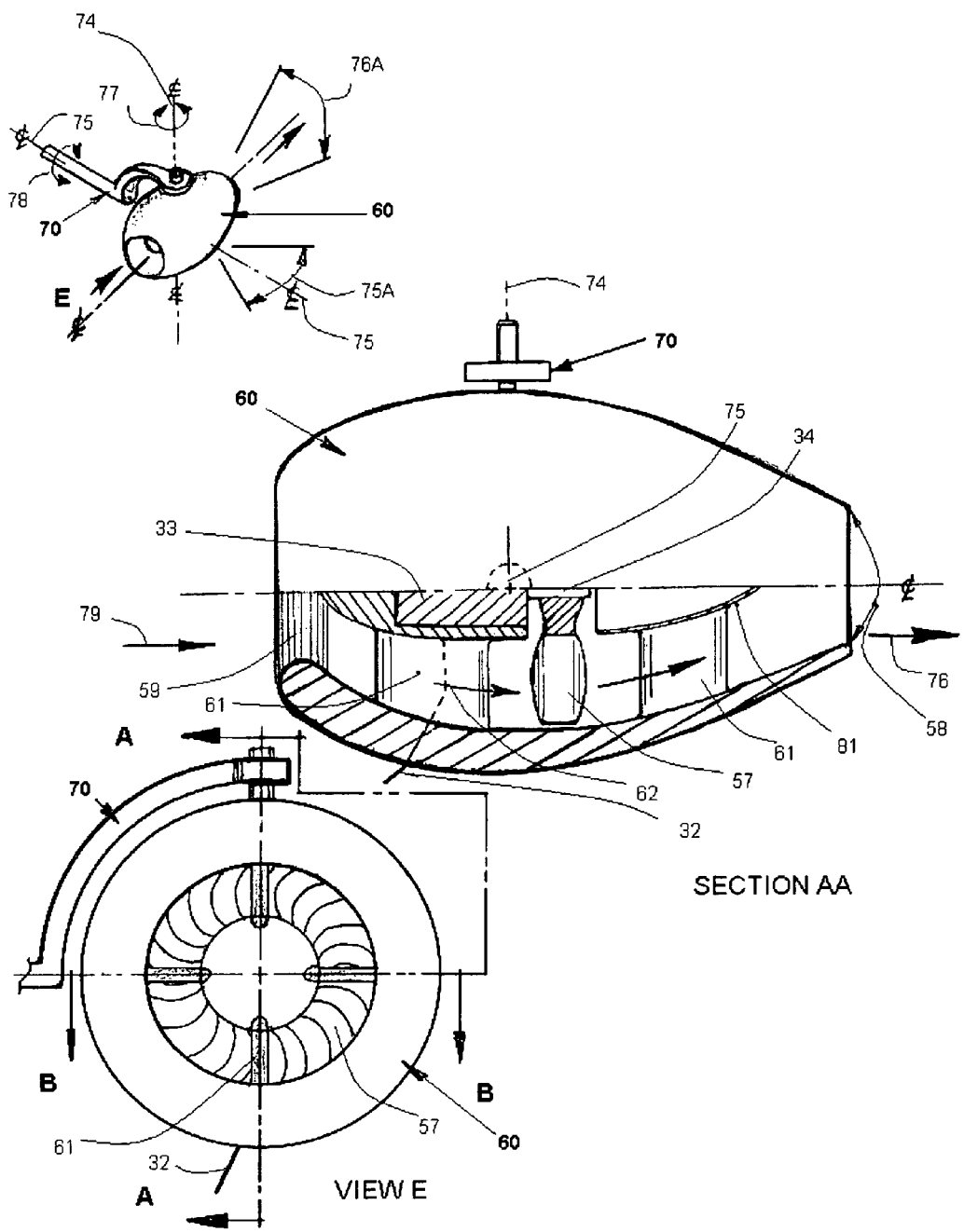
FIG. 7 is a ¼ section of a nacelle ducted fan system.

The nacelle module 60 FIG. 7 having air inlet 79 has a cantilevered 70 structure arm, gimbaled rotation 78, axis 75, thrust A/C yaw capability 76A; and gimbaled rotation 77, axis 74 means for thrust 76 vectoring 75A. The fan rotor has a delta pressure produced with bladed rotor rotation and nozzle 58 thrust 76 means. The fan rotor motor 33 within a module 82 is retained with the nacelle 60 via struts 61; the bearings of the alternator and alternator rotor cooling lube and cooling considerations can be contained within 82 or supplied thru channels 62 of a strut 61. The drive motor could have integrated cooling fins on the motor module 33 to cool the alternator stator.

Figure 2:
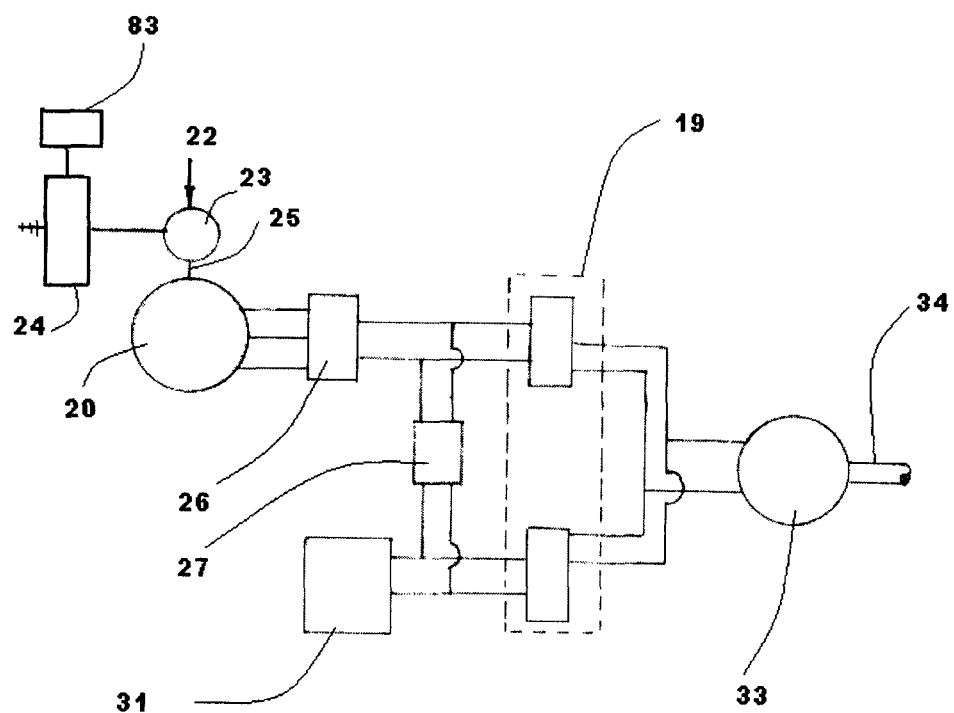
FIG. 2 is a Hybrid Gas Turbine schematic, parallel hybrid electrical power system
Figure 3:
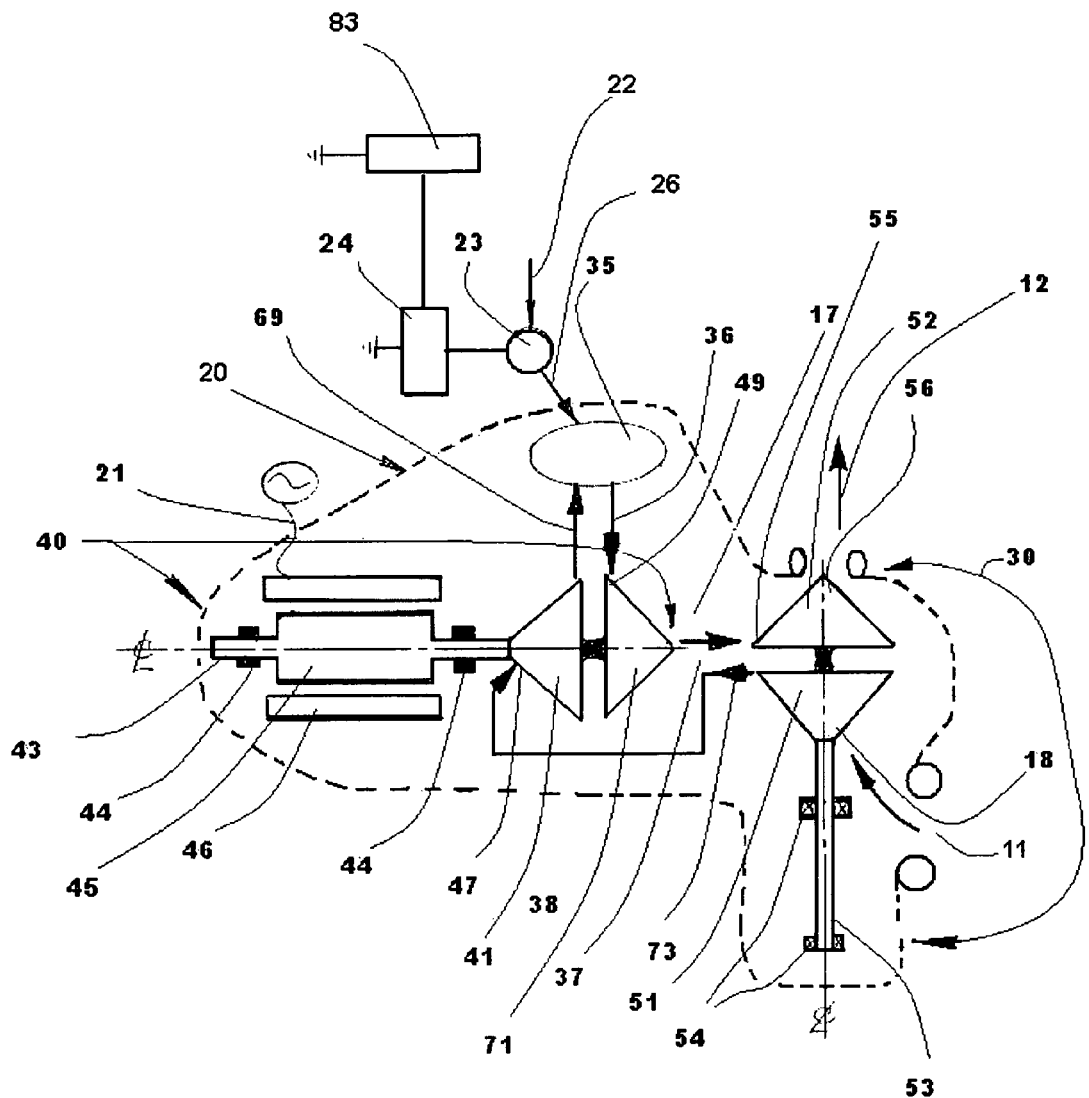
FIG. 3 is a schematic of a Hybrid Gas Turbine electrical powerplant.

Continuing now with a vehicle propulsion motor power cruise condition is processed via a throttle box command signal a decel mode from EECU 24 with programmed algorithms decel fuel supply rate is activated to reduce the fuel flow 16A thru the interconnected fuel valve 23 to seek a preprogrammed N2 speed or maximum N2 turbine rotor 71 exiting gas 17 with ducted flow 37; this max exhaust EGT point 66A on speed line 66. In the decel mode the air flow is reduced via the reduced N2 turbine 17 exit exhaust ducted 37 flow to N1 turbine entrance 55 of turbine rotor 52 thus reducing the air flow, N1 spool speed compressor 51 air flow to the power spool compressor 41 inlet 47 air flow supply ducted 38. Air flow and combustor heat energy define the power output capability from the turbine rotor 71 to drive the compressor rotor 41 and alternator rotor 45. Considering fuel economy (reduce fuel consumption) for a given power output requirement say for a standard auto cruise condition of 60 MPH at 10 Kw or 10% of 100 Kw max. engine output electrical power is needed and thus reduced airflow optimized EGT (maximum #2 spool N2 spool turbine rotor exit 17) with airflow reduction considerations gives the best fuel economy for the HGT reduced power requirements; and outperforms other internal combustion engines, Ref. FIG. 4, at 10% power 63 or 10 Kw of a 100 Kw engine for example there is less fuel flow in the HGT engine compared to other engines, FIG. 4, comparing the diesel engine turbo-charged intercooled the HGT engine 64 there is ~4% fuel saving along with other benefits as good high power density. Looking further to more typical vehicles using gasoline piston type engine there is a 10% improvement #65 in efficiency or to 3 times the mpg improvement. The voltage regulator 27 interconnected to the battery 31 maintains the battery pack 31 voltage via the engine output power of the HGT 20 output electrical power 21 processed thru the power electronics 26 and thru cables 28 form the engine module 20. The EPSC (Electric Power Source Controller) 19 of the parallel power system FIG. 2 is a means to select the electric power source to drive the motor/controller 33 whether single source battery pack 31 or engine 20 electrical output power thru power electronics 26 or in combination. The differential connects with the motor 33 output shaft 34 as in a car can be gear box speed reducer to drive the wheels and an aircraft applications a high speed motor is incorporated as a means to reduce the speed to drive a large fan, propeller or bladed rotor of lesser speeds. The differential as a speed reducer to the prime mover electric motor can be in line positioned coaxially with to thrust producer or without speed reduction or integrate a angle drive means.

As to further discussion of the manner of usage and operation of the present invention, then should be apparent form the above description. Accordingly, no further discussion relating the manner of usage and operation will be provided.

With respect to the above description then, it is to be realized that the optimum dimensional relationship for the parts to the invention, to include variations in size, materials, shape, form, function and manner of operation, assembly and, are deemed readily apparent and obvious to one skilled in the art, land all equivalent relationships to the illustrated in the drawing and described in the specification are intended to be encompassed by the present invention.

Therefore, the foregoing is considered as illustrative only of the participles of the invention. Further, since numerous modification changes will readily occur to those skilled in the art, it is not desired to limit the invention to the exact construction and operation shown and described, and accordingly, all suitable modifications and equivalents may be resorted to, falling within the scope of the invention.

What is claimed:

1. A hybrid electric power system having a hybrid gas turbine (HGT) electrical power plant as one electric power source and a battery pack as another electric power source in combination with a motor drive system as a prime mover for vehicular propulsion comprised of:
   a) the hybrid gas turbine (HGT) electrical power plant having,
      an engine body,
      at least two spools within the engine body where a first spool is an electric power producer having an integrated alternator rotor with retained permanent magnets, a compressor rotor driven by a turbine rotor via a rotatable shaft;
      a second spool having fluid communication with the first spool, has an integrated compressor rotor driven by a turbine rotor via a rotatable shaft, whereas the compressor rotor of the second spool has an air inlet supply supplying compressed air to a compressor rotor inlet of the compressor rotor of the first spool, a turbine rotor exit of the turbine rotor of the first spool is in communication with a turbine rotor inlet of the turbine rotor of the second spool;
      an alternator stator within the engine body having stacked iron laminates, magnetic wound wire and output power leads, the alternator is co-axially located about and in close proximity to said alternator rotor; and
      a combustor within said engine body, has communication with a compressor exit and a turbine rotor inlet of the turbine rotor of the first spool and also within at least one fuel/air nozzle and an igniter;
   b) an electro-mechanical fuel valve for controlling the fuel flow to the combustor, having a fuel inlet supply line from an external fuel source and a fuel exit/discharge in communication with said fuel/air nozzle within the HGT;
   c) a power electronics package is in communication with said HGT, and said alternator stator output power leads for converting engine output high voltage-high frequency power to useful electrical power and frequency;
   d) an electronic engine control unit (EECU) having electrical communication with said electro-mechanical fuel valve;
   e) a throttle box having electrical communication with the said EECU;
   f) a voltage regulator is in communication with the power electronics package and said EECU;
   g) the battery pack is in series with the said power electronics package and has communication with said EECU;
   h) an electrical power source control (EPSC) having communication with said battery pack; and
   i) at least one electric motor having an output power shaft and in communication with said EPSC and said EECU, wherein said EPSC is used to select said electric power source to drive said at least one electric motor.

2. The hybrid electrical power system according to claim 1, said electric motor output power shaft drives a high speed ducted fan for motive thrust means.

3. The hybrid electrical power system according to claim 1, said electric motor output power shaft is connected to a fan within a nacelle and as a module is gimbaled positioned for thrust vectoring means.

4. The hybrid electrical power system according to claim 1, said electric output motor shaft drives a differential for vehicle propulsion.

5. The hybrid electrical power system according to claim 1, said electric motor output shaft receives mechanical rotational energy as a vehicle braking means, whereas the electric motor becomes an alternator creating electrical energy for storage.

6. The hybrid electrical power system according to claim 1, the HGT thru defined algorithms within the electrical engine control governs the gas turbine power spool rotor speed for required engine power source command output electrical power demand.

7. A hybrid electric power system having a hybrid gas turbine (HGT) electrical power plant as one electric power source and a battery pack as another electric power source in combination with a motor drive system as a prime mover for vehicular propulsion comprised of:
   a) the hybrid gas turbine (HGT) electrical power plant consisting of:
      an engine body,
      at least two spools within the engine body where a first spool is an electric power producer having an integrated alternator rotor with retained permanent magnets, a compressor rotor driven by a turbine rotor via a rotatable shaft;
      a second spool having fluid communication with the first spool, has an integrated compressor rotor driven by a turbine rotor via a rotatable shaft, whereas the compressor rotor of the second spool has an air inlet supply supplying compressed air to a compressor rotor inlet of the compressor rotor of the first spool, a turbine rotor exit of the turbine rotor of the first spool is in communication with a turbine rotor inlet of the turbine rotor of the second spool;
      an alternator stator within the engine body having stacked iron laminates, magnetic wound wire and output power leads, the alternator is co-axially located about and in close proximity to said alternator rotor; and
      a combustor within said engine body, has communication with a compressor exit and a turbine rotor inlet of the turbine rotor of the first spool and also within at least one fuel/air nozzle and an igniter;
   b) an electro-mechanical fuel valve for controlling the fuel flow to the combustor, having a fuel inlet supply line from an external fuel source and a fuel exit/discharge in communication with said fuel/air nozzle within the HGT;
   c) a power electronics package is in communication with said HGT, and said alternator stator output power leads for converting engine output high voltage-high frequency power to useful electrical power and frequency;
   d) an electronic engine control unit (EECU) having electrical communication with said electro-mechanical fuel valve;
   e) a throttle box having electrical communication with the said EECU;
   f) a voltage regulator is in communication with the power electronics package, the battery pack, and said EECU;

g) the battery pack is in parallel with the said power electronics package and has communication with said EECU;

h) an electrical power source control (EPSC) having communication with said battery pack; and i) at least one electric motor having an output motor power shaft and in communication with said EPSC and said EECU, wherein said EPSC is used to select said electric power source to drive said at least one electric motor.

8. The hybrid electrical power system according to claim 7, said electric motor output power shaft drives a high speed ducted fan for motive thrust means.

9. The hybrid electrical power system according to claim 7, said electric motor output power shaft is connected to a ducted fan within a nacelle and this as a module is rotatable positioned during vehicle propulsion for thrust vectoring.

10. The hybrid electrical power system according to claim 7, said electric output motor shaft drives a differential for vehicle propulsion.

11. The hybrid electrical power system according to claim 7, said electric motor output shaft receives mechanical rotational energy as a vehicle braking means, wherein the electric motor becomes an alternator creating electrical energy for storage.

12. The hybrid electrical power system according to claim 7, the said HGT thru defined algorithms within the electrical engine control governs the gas turbine power spool rotor speed for required engine power source command output electrical power demand.

13. A hybrid gas turbine engine as one electric power source for a motor drive system as a prime mover for vehicular propulsion comprised of:

a) a hybrid gas turbine (HGT) electrical power plant having, an engine body, at least two spools within the engine body where a first spool is an electric power producer has an integrated alternator rotor with retained permanent magnets, a compressor rotor driven by a turbine rotor via a rotatable shaft;

a second spool having fluid communication with the first spool, has an integrated compressor rotor driven by a turbine rotor via a rotatable shaft, whereas the compressor rotor of the second spool has an air inlet supply supplying compressed air to a compressor rotor inlet of the compressor rotor of the first spool, a turbine rotor exit of the turbine rotor of the first spool is in communication with a turbine rotor inlet of the turbine rotor of the second spool;

an alternator stator within the engine body having stacked iron laminates, magnetic wound wire and output power leads, the alternator is co-axially located about and in close proximity to said alternator rotor; and a combustor within the said engine body, has communication with a compressor exit and a turbine rotor inlet of the turbine rotor of the first spool and also within at least one fuel/air nozzle and an igniter;

b) an electro-mechanical fuel valve for controlling the fuel flow to the combustor, having a fuel inlet supply line from an external fuel source and a fuel exit/discharge in communication with said fuel/air nozzle within the HGT;

c) a power electronics package is in communication with the said HGT, and said alternator stator output power leads for converting engine output high voltage-high frequency power to useful electrical power and frequency; and d) an electronic engine control unit (EECU) having power spool speed algorithms and is in electrical communication with said electro-mechanical fuel valve;

e) a throttle box having electrical communication with the said EECU;

f) a voltage regulator is in communication with the power electronics package and said EECU;

g) a battery pack is in communication with the said power electronics package, said EECU, and said voltage regulator, wherein said battery pack is another electric power source;

h) an electrical power source control (EPSC) having communication with said battery pack; and i) at least one electric motor having an output power shaft as a prime mover for vehicular propulsion and in communication with the said EPSC and said EECU, wherein said EPSC is used to select said electric power source to drive said at least one electric motor.

14. A hybrid gas turbine engine as one electric power source within an electrical power plant system comprised of:

a) a hybrid gas turbine (HGT) electrical power source consisting of an engine body, at least two spools within the engine body where a first spool is an electric power producer has an integrated alternator rotor with retained permanent magnets, a compressor rotor driven by a turbine rotor via a rotatable shaft;

a second spool having fluid communication with the first spool, has an integrated compressor rotor driven by a turbine rotor via a rotatable shaft, whereas the compressor rotor of the second spool has an air inlet supply supplying compressed air to a compressor rotor inlet of the compressor rotor of the first spool, a turbine rotor exit of the turbine rotor of the first spool is in communication with a turbine rotor inlet of the turbine rotor of the second spool;

an alternator stator within the engine body having stacked iron laminates, magnetic wound wire and output power leads, the alternator is co-axially located about and in close proximity to said alternator rotor; and a combustor within said engine body, has communication with said power spool, a compressor exit and the power spool, a turbine rotor inlet of the turbine rotor of the first spool and also within at least one fuel/air nozzle and an igniter;

b) an electro-mechanical fuel valve for controlling the fuel flow to the combustor, having a fuel inlet supply line in communication with an external fuel source, and a fuel exit/discharge in communication with the said fuel/air nozzle within the HGT;

c) a power electronics package is in communication with said HGT, and said alternator stator output power leads for converting engine output high voltage-high frequency power to useful electrical power and frequency;

d) an electronic engine control unit (EECU) with power spool speed algorithms is in electrical communication with said electro-mechanical fuel valve;

e) a voltage regulator is in communication with the power electronics package and said EECU;

f) a battery pack is in communication with said voltage regulator, wherein said battery pack is another electric power source;

g) an electrical power source control (EPSC) having communication with said battery pack; and h) at least one electric motor having an output power shaft as a prime mover for vehicular propulsion and in communication with the said EPSC and said EECU, wherein said EPSC is used to select said electric power source to drive said at least one electric motor.

15. A hybrid electrical power system according to claim 1, said electric motor output power shaft is connected to a differential and the said differential rotates a rotor having bladed airfoil shapes for vehicle propulsion.

16. A hybrid electrical power system according to claim 7, said electric motor output power shaft is connected to a differential and the said differential rotates a rotor having airfoil shape blades for vehicle propulsion.

\* \* \* \* \*